US009577867B2

(12) United States Patent
Cudak et al.

(10) Patent No.: US 9,577,867 B2
(45) Date of Patent: Feb. 21, 2017

(54) DETERMINING A TIME BEFORE A POST IS VIEWED BY A RECIPIENT

(71) Applicant: International Business Machines Corporation, Armonk, NY (US)

(72) Inventors: Gary D. Cudak, Wake Forest, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/266,955

(22) Filed: May 1, 2014

(65) Prior Publication Data
US 2015/0319115 A1    Nov. 5, 2015

(51) Int. Cl.
*H04L 29/06*    (2006.01)
*H04L 12/58*    (2006.01)

(52) U.S. Cl.
CPC ............. *H04L 29/06* (2013.01); *H04L 51/043* (2013.01); *H04L 51/046* (2013.01); *H04L 51/32* (2013.01); *H04L 51/34* (2013.01); *H04L 65/403* (2013.01)

(58) Field of Classification Search
CPC .... H04L 51/046; H04L 65/403; H04L 51/043; H04L 51/34
USPC .......................................................... 709/206
See application file for complete search history.

(56) References Cited

U.S. PATENT DOCUMENTS

| 7,475,116 | B2 | 1/2009 | Hay | |
|---|---|---|---|---|
| 2007/0112920 | A1* | 5/2007 | Hay | H04L 12/58 709/206 |
| 2009/0037532 | A1* | 2/2009 | Estrada | G06F 11/3419 709/205 |
| 2010/0017484 | A1* | 1/2010 | Accapadi | G06Q 10/107 709/206 |

(Continued)

FOREIGN PATENT DOCUMENTS

WO    2012064875 A1    5/2012

OTHER PUBLICATIONS

Aly et al., "Towards a robust modeling of temporal interest change patterns for behavioral targeting", ACM Digital Library, WWW '13 Proceedings of the 22nd international conference on World Wide Web, pp. 71-82, International World Wide Web Conferences Steering Committee, Republic and Canton of Geneva, Switzerland, Copyright 2013, ISBN: 978-1-4503-2035-1, <http://dl.acm.org/citation.cfm?id=2488396>.

(Continued)

*Primary Examiner* — Nicholas Taylor
*Assistant Examiner* — Chong G Kim
(74) *Attorney, Agent, or Firm* — Brandon C. Kennedy; Robert R. Williams; Kennedy Lenart Spraggins LLP (57) ABSTRACT

In an approach to determining a time before a recipient views a communication, a computer receives a communication from a sender in a collaboration application. The computer determines one or more attributes of the communication, the attributes including at least a recipient of the communication, and a plurality of viewing data for the recipient of the communication. The computer determines, based, at least in part, on the one or more attributes of the communication and the plurality of viewing data for the recipient, a time before the recipient views the communication in the collaboration application.

20 Claims, 4 Drawing Sheets

(56) References Cited

U.S. PATENT DOCUMENTS

| | | | | |
|---|---|---|---|---|
| 2010/0082751 A1* | 4/2010 | Meijer | .................... | G06F 15/16 709/206 |
| 2010/0169264 A1* | 7/2010 | O'Sullivan | ............ | G06Q 10/10 706/52 |
| 2010/0211592 A1* | 8/2010 | Brownlee | ................ | H04L 12/58 707/769 |
| 2010/0250682 A1* | 9/2010 | Goldberg | ............. | G06Q 10/107 709/206 |
| 2011/0087742 A1* | 4/2011 | Deluca | ................. | G06Q 10/107 709/206 |
| 2011/0087743 A1* | 4/2011 | Deluca | ................. | G06Q 10/107 709/206 |
| 2011/0087744 A1* | 4/2011 | Deluca | ................. | G06Q 10/107 709/206 |
| 2012/0143798 A1* | 6/2012 | Sundelin | .............. | G06Q 10/107 706/12 |
| 2012/0246252 A1* | 9/2012 | Denise | ................. | G06Q 10/107 709/206 |
| 2012/0284297 A1* | 11/2012 | Aguera-Arcas | ....... | G06F 21/629 707/769 |
| 2012/0331101 A1* | 12/2012 | Itaya | ................... | H04L 12/5885 709/217 |
| 2013/0086179 A1* | 4/2013 | Coleman | ................. | H04W 4/12 709/206 |
| 2013/0159220 A1* | 6/2013 | Winn | ................ | G06F 17/30702 706/12 |
| 2013/0231999 A1 | 9/2013 | Emrich et al. | | |
| 2013/0275348 A1* | 10/2013 | Booth | ...................... | G06N 5/02 706/12 |
| 2013/0325755 A1* | 12/2013 | Arquette | ................. | H04L 51/32 706/12 |
| 2014/0006591 A1* | 1/2014 | Davis | .................... | H04W 48/18 709/224 |
| 2014/0006611 A1* | 1/2014 | Perez | ...................... | H04L 43/04 709/224 |
| 2014/0088944 A1* | 3/2014 | Natarajan | .............. | G06Q 30/02 703/13 |
| 2014/0173009 A1* | 6/2014 | Denise | ................. | G06Q 10/107 709/206 |
| 2014/0173020 A1* | 6/2014 | Reilly | .................... | H04L 67/32 709/217 |

OTHER PUBLICATIONS

Benevenuto et al., "Characterizing User Behavior in Online Social Networks", IMC'09, Nov. 4-6, 2009, Chicago, Illinois, USA, Copyright 2009 ACM, 978-1-60558-770-7/09/11, <http://pages.cs.wisc.edu/~akella/CS740/S11/740-Papers/BEN%2B09.pdf>.

"HubSpot SEO tools keep you on target", SEO Software, HubSpot, Copyright 2013 HubSpot, Inc., <http://www.hubspot.com/products/seo>.

"Twitter retweet predictor helps you track Kim Kardashian", SiliconBeat, May 29, 2013, Copyright 2013, SiliconBeat, <http://www.siliconbeat.com/2013/05/29/twitter-retweet-predictor-helps-you-track-kim-kardashian/>.

* cited by examiner

Posted: Feb 25 2014, 09:49 AM

I found this forum while searching for information. Thanks in advance for any input.

I own a small e-commerce site. We have been in business for over 5 years and have done well. We would like to expand however and were looking for any information on how to increase our search results on certain search engines.

If anyone can offer any assistance that would be great, thank you.

320

Estimated Reply: Feb 28
Suggestion(s):
Reduce word count
Post 5:30 PM Weekday

DETERMINING A TIME BEFORE A POST IS VIEWED BY A RECIPIENT

FIELD OF THE INVENTION

The present invention relates generally to the field of collaborative applications, and more particularly to determining an estimated time before a post is likely to be viewed by a recipient based on historical and behavioral information of the recipient.

BACKGROUND OF THE INVENTION

Collaboration applications, including messaging and social network communication platforms, allow users to send messages, post comments or chat in real time with other users online at the same time. Due to social media features like instant messaging and chat, which allow users to send quick messages built into the social media websites, social networking has become a popular forum for communication. With the increasing use of social networking within corporate and personal communication, including internet discussion forums and other social media websites, there is increased need for individuals to efficiently use this social network communication. In certain cases, a reply to a message or invitation may be urgent; however, the recipient may not be able to view the information in order to timely reply.

Particularly, on a discussion forum, a user can submit a question or topic and receive replies from other users. A forum can contain a number of sub-forums, each of which may have several topics. Within a forum's topic, each new discussion is called a thread, and can be replied to by as many people as so wish. A sender may create a post that requires a quick response; however, if the post is submitted at a time when few people are available to leave feedback or the post becomes buried within multiple replies from other users, the sender may receive a delayed response.

SUMMARY

Embodiments of the present invention disclose a computer-implemented method, a computer program product, and a computer system for determining a time before a recipient views a communication. The method includes a computer receiving a communication from a sender in a collaboration application and determining one or more attributes of the communication, the attributes including at least a recipient of the communication. The method includes the computer determining a plurality of viewing data for the recipient of the communication. The method then includes the computer determining, based, at least in part, on the one or more attributes of the communication and the plurality of viewing data for the recipient, a time before the recipient views the communication in the collaboration application.

DETAILED DESCRIPTION

Figure 1:
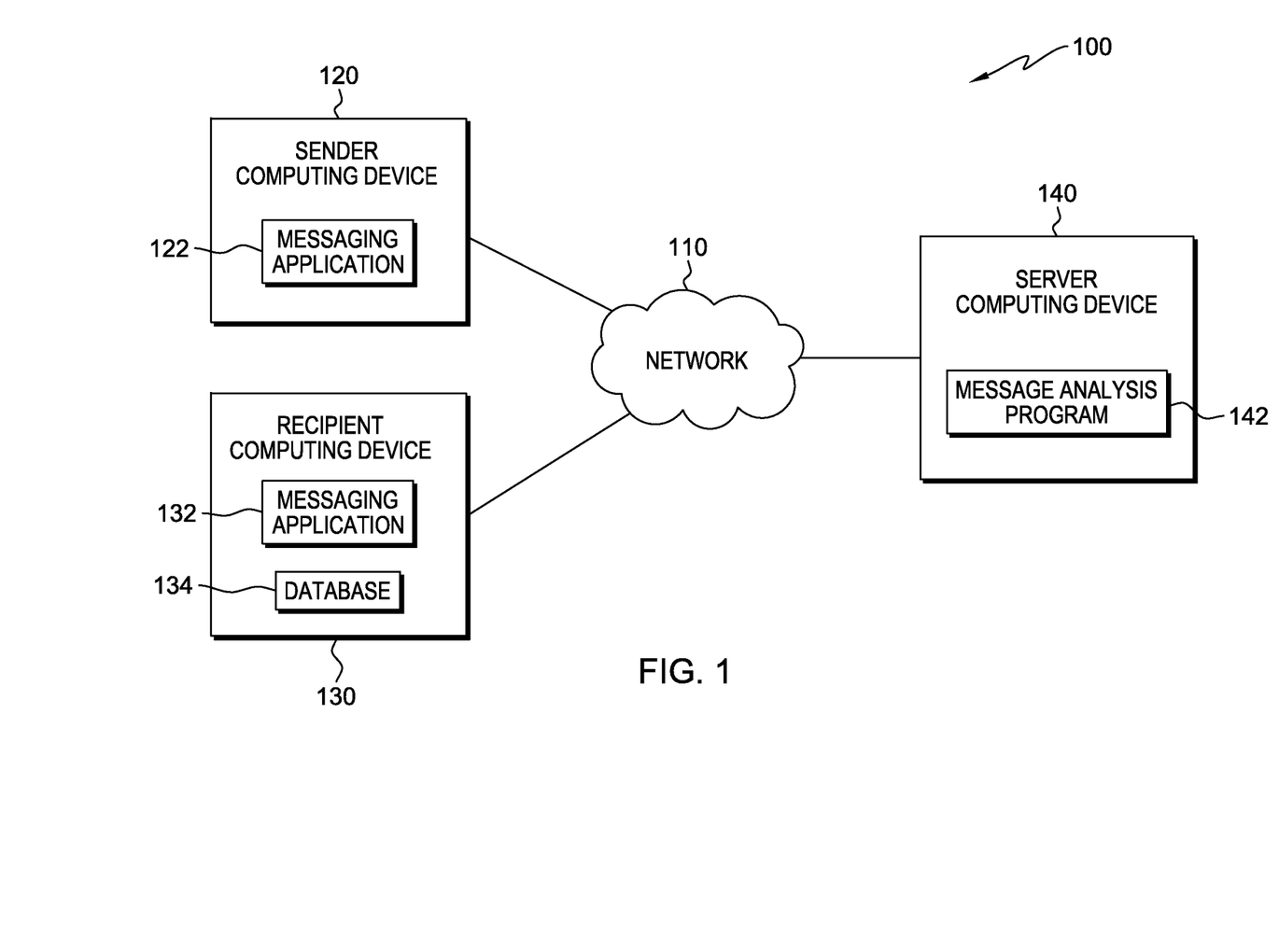
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted environment may be made by those skilled in the art without departing from the scope of the invention as recited by the claims.

Distributed data processing environment 100 includes sender computing device 120, recipient computing device 130 and server computing device 140, all interconnected over network 110. Network 110 can be, for example, a local area network (LAN), a telecommunication network, a wide area network (WAN) such as the internet, or a combination of the three, and can include wired, wireless, or fiber optic connections. In general, network 110 can be any combination of connections and protocols that will support communication between sender computing device 120, recipient computing device 130 and server computing device 140, in accordance with embodiments of the present invention.

Sender computing device 120 includes messaging application 122. Recipient computing device 130 includes messaging application 132 and database 134. In various embodiments of the present invention, sender computing device 120 and recipient computing device 130 can be a laptop computer, a personal digital assistant (PDA), a smart phone, or any programmable electronic device capable of communicating with each other and with server computing device 140 via network 110. Messaging application 122 allows a sender to communicate with and interact with a recipient operating messaging application 132. Messaging application 122 and 132 can be a collaboration application, a social networking application, or any network based communication application capable of managing the sending, receiving, and the presentation of communication. In an exemplary embodiment, communications between messaging application 122 and 132 can be in a text format, but can also include audio and video as well. Database 134 contains a calendar, a schedule, and any other information associated with a recipient operating recipient computing device 130.

Server computing device 140 includes message analysis program 142 and may be a management server, a web server, or any other electronic device or computing system capable of receiving and sending data. Alternatively, server computing device 140 can be a laptop computer, a tablet computer, a netbook computer, a personal computer (PC), a desktop computer, a PDA, a smart phone, or any programmable electronic device capable of communicating with sender computing device 120 and recipient computing device 130 via network 110, and with other various components and devices within distributed data processing environment 100. In other embodiments, server computing device 140 may represent a server computing system utilizing multiple computers as a server system, such as in a cloud computing environment. In an embodiment of the present invention, server computing device 140 represents a computing system utilizing clustered computers and components (e.g., database server computer, application server computers, etc.) that act as a single pool of seamless resources when accessed within distributed data processing system 100.

Message analysis program 142 receives a communication from a sender operating sender computing device 120. A communication can be, for example, a message, an invitation, or a post, for example, a social network or a discussion forum post. Message analysis program 142 retrieves attributes of the communication, such as content, subject, intended recipients, and an importance setting of the communication. Additionally, message analysis program 142 retrieves recipient data stored in database 134. Recipient data can include information such as the recipients' calendar, the recipients' history of reading or viewing behavior, and whether the recipient is logged into a social network. Message analysis program 142 notifies the sender of an estimate of the expected time of when a communication is to be viewed. If the time is not sufficient for the sender, message analysis program 142 suggests alterations to the communication to reduce the time. Message analysis program 142 may be used as a plug-in or can be built into an existing social networking application. While message analysis program 142 in FIG. 1 is included within server computing device 140, one of skill in the art will appreciate that in other embodiments, message analysis program 142 may be located within recipient computing device 130 or elsewhere within distributed data processing environment 100 and can communicate with database 134 and server computing device 140 via network 110.

Figure 2:
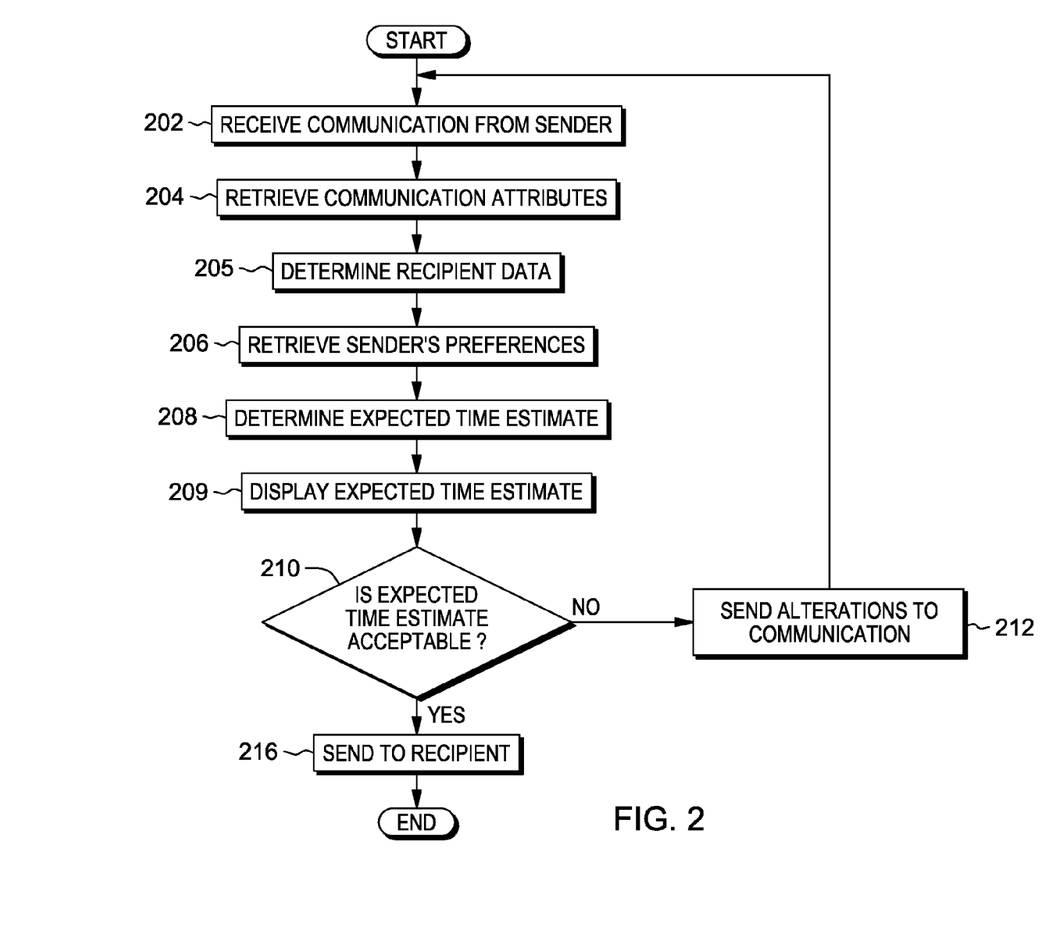
FIG. 2 is a flowchart depicting operational steps of a message analysis program for analyzing a communication and information on a recipient in order to provide a time before the communication is to be viewed by the recipient, in accordance with an embodiment of the present invention.

FIG. 2 is a flowchart depicting operational steps of message analysis program 142 for analyzing a communication and information on a recipient in order to provide a time before the communication is to be viewed by the recipient, in accordance with an embodiment of the present invention.

Message analysis program 142 receives a communication from a sender (step 202). The communication may be an email or a post sent by a user operating messaging application 122 via network 110 and can be intercepted by server computing device 140. Alternately, the communication can be sent directly to server computing device 140. In an embodiment, message analysis program 142 operates on recipient computing device 130 and receives the communication from the sender on the device 130.

Message analysis program 142 retrieves attributes of the communication (step 204). In various embodiments of the present invention, attributes may be set by the sender and included in the content of the communication, or attributes may be stored in a database or in a social networking or messaging application by the sender and associated with various types of communication. For example, the sender may have a pre-defined list of recipients for a subject matter or a discussion forum website. Attributes of the communication can be, for example, a content, a subject of the communication, an importance setting of the communication, a list of those who will have access to the communication, including a target recipient, a group of recipients, or users with access to a certain blog or website, and the sender. In an exemplary embodiment, message analysis program 142 determines a recipient or a group of recipients for the communication based on the attributes of the communication. In an embodiment, an importance setting of the communication can be established by the sender. For example, if an email communication is marked with a high importance setting, the email may be higher in the recipients' inbox. If no importance setting is selected, the email importance defaults to a "normal" setting.

Message analysis program 142 determines viewing data for a recipient (step 205). In various embodiments, viewing data can include, for example, the recipient's calendar schedule, a history of the recipient's social networking or messaging communication viewing and reading behavior, data on whether aspects of the communication will cause it to be displayed to a recipient on recipient computing device 130 or whether the recipient will receive a notification to retrieve the communication. Viewing data may also include data on whether the communication will be displayed prominently to the recipient, for example, at the top of an inbox or a discussion forum, including whether the recipient receives a high number of messages per day or per week, data on whether the recipient is currently logged into messaging application 132, and data on the state of status of the recipients additional social networking or messaging service use to determine, for example, if the recipient may be distracted by other activities, such as a browser plug-in running for a second social media network requiring online activity. The recipient's social networking behavior history may include, for example, how often a recipient checks a messaging or social networking application such as messaging application 132 and what times or days of the week the recipient checks the application, whether or not the recipient sets notifications to be triggered by a specific post, whether the recipient typically responds to posts of a certain subject, and the recipient's activity when there are additional users involved in a discussion. In an embodiment, viewing data for the recipient may include a consumption rate of messages for the recipient, for example, how many messages the recipient views in a pre-determined time period. Additional viewing data may include a message length and content that the recipient can view in a threshold of time.

Message analysis program 142 can analyze the recipient's schedule retrieved from the recipient's calendar to determine whether a communication may be missed because the recipient is busy. In an embodiment, message analysis program 142 can determine a location of a recipient based on a location of recipient computing device 130. If the device 130 is a smart phone, the location of the recipient may indicate the recipient is driving or is on vacation and may not be able to view or respond to a communication. In embodiments, the history of the recipients' viewing and reading behavior can include activity by the recipient on discussion forums, with instant messages, and with received emails, such as whether the recipient has a large number of unread emails.

In another embodiment, the recipient may pre-set viewing preferences. For example, if a recipient were to set their calendar to show they are always unavailable at a certain time, message analysis program 142 may determine not to send any messages during that time. Also, types of activities of the recipient during a scheduled calendar time can dictate the types of communications the recipient may view, for example, a calendar activity for "at the gym" indicates the recipient can receive certain types of communication, such as social networking invitations or message, but an activity for "in a meeting" indicates the recipient will not view any communications received.

Message analysis program 142 retrieves the sender's preferences (step 206). In an embodiment, the sender inputs preferences corresponding to the communication to message analysis program 142. In another embodiment, sender preferences corresponding to the communication may be retrieved from content of the communication. In other embodiments, the sender may store preferences within message analysis program 142 to be applied to each message the sender posts, or preferences may be stored for types of posts. Preferences can be, for example, a time for a post or communication to be read, an amount of time for a recipient to spend reading the communication a response to the communication, and a percentage of a group of recipients to view the communication. In an embodiment, the sender preferences can include a threshold value of time in which the communication is to be viewed.

Message analysis program 142 determines an expected time estimate or a time lapse before the communication is viewed (step 208). The expected time estimate can be predicted based on one or more of the attributes of the post, the recipients' data, and the senders' preferences. In an embodiment, the expected time estimate is a measure of when the recipient may view the communication from the sender. The expected time estimate may be a time lapse or a range, such as 2-3 days, or it may be a specific time estimate, for example, 2:00 pm. In embodiments, the sender may select one or more recipients with a higher priority for viewing than other recipients, for example, by ranking the recipients, and message analysis program 142 may determine an expected time for the selected recipients. In an embodiment, message analysis program 142 determines a quality with which the communication may be viewed, such as a time spent viewing, based on a recipient's calendar or a recipient's previous viewing behavior, either on communications in general or with communications on a certain subject. For example, based on the recipient's calendar, if the recipient has an appointment in thirty minutes, the recipient is not likely to spend time viewing a lengthy communication sent within the thirty minutes before the appointment.

Message analysis program 142 displays the expected time estimate (step 209). A display can be, for example, a pop-up, an email displaying the expected time, a notification on a social media application, an instant message, or any other notification provided to the sender on the sender computing device 120 or on another device such as a tablet or phone via network 110. In an embodiment, message analysis program 142 can display the quality estimation as well.

Message analysis program 142 determines whether the expected time estimate is acceptable (decision block 210). In an embodiment, the sender provides an indication to message analysis program 142 that the time estimate is acceptable, for example, by accepting the estimated time with a click of a mouse or entering a key sequence. In another embodiment, the sender can set pre-determined threshold values of time for each communication sent and message analysis program 142 determines whether the expected time estimate is acceptable by comparing the expected time estimate to the pre-determined threshold values. If the expected time estimate exceeds a pre-determined threshold value of time, message analysis program 142 can determine alterations to the communication and send the alterations to the sender. In other embodiments, the sender may respond to the displayed time with a revised communication, signifying the expected time estimate was not acceptable. If the expected time estimate is acceptable (decision block 210, yes branch), message analysis program 142 sends the communication to the recipient (step 216), and processing ends.

If message analysis program 142 determines the expected time estimate is not acceptable (decision block 210, no branch), the program sends suggested alterations to the communication (step 212). Suggested alterations may be, for example, to decrease a word count of the communication, to send communication to the recipient at a different time, or to revise the content or subject of the communication. In an alternate embodiment of the present invention, message analysis program 142 may determine and send alternate forms of communication for the message to be sent in order to reduce the estimated time, for example, an instant messaging application instead of an email application. In another embodiment, message analysis program 142 may determine an optimal time to send a communication and suggest the optimal time as an alternative. An optimal time can be determined based on the history of the recipient, including time spent reading, viewing, or responding to messages, a state or status of the recipient, for example, a current location of the recipient, a number of unread inbox messages, or a flow rate of messages. Message analysis program 142 can also determine an optimal time by viewing the calendar of the recipient and a consumption rate of the recipient, for example, a quantity of messages the recipient typically views and responds to in a period of time.

Message analysis program 142 may send suggested alterations to the sender in an instant message, an email, a display box or any other notification provided to the sender on the sender computing device 120 or on another device such as a tablet or phone via network 110. In an embodiment, message analysis program 142 provides suggested alterations to the communication at the same time or in the same notification to the sender as the expected time estimate. After sending the suggested alterations to the communication, message analysis program 142 returns to receive a communication from the sender (step 202).

Figure 3:
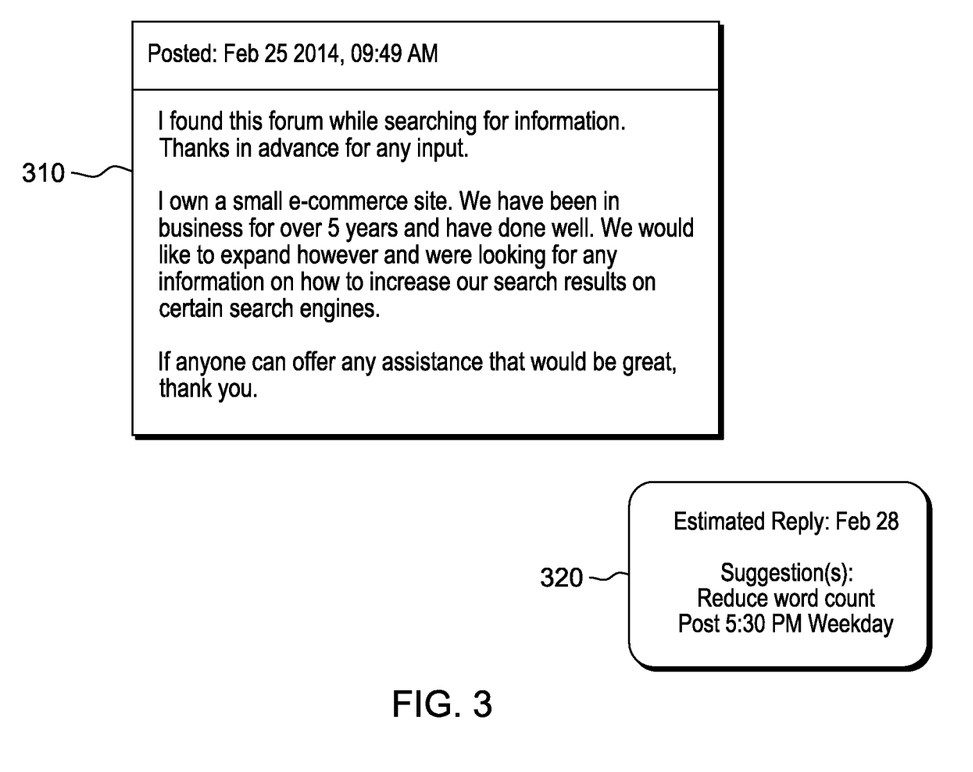
FIG. 3 illustrates an exemplary post from a sender and exemplary results provided to the sender by the message analysis program of FIG. 2, in accordance with an embodiment of the present invention.

FIG. 3 illustrates an exemplary post from a sender and exemplary results provided to the sender by message analysis program 142, in accordance with an embodiment of the present invention.

Post 310 is an original post sent from a sender to a recipient. In the illustrated embodiment, the post can be a post on a discussion forum or microblog site. Message analysis program 142 retrieves attributes of the post, including information on a target recipient or group of recipients, and sender preferences. Post 310 may contain information in the content on the target recipients, for example, the target recipients may be anyone that reads the discussion forum or may be the owners of the discussion forum. Message analysis program 142 determines data of the target recipient or group of recipients and determines an estimated time before the post may be read and replied to on the discussion forum site. In an embodiment, the estimated time is displayed for the sender, depicted in results 320, along with any suggested alterations to the post to decrease the time before the post may be read or replied to, including, for example, an optimal time that the post may be read and replied to by the target recipient or group of recipients, based on data of the recipient.

Figure 4:
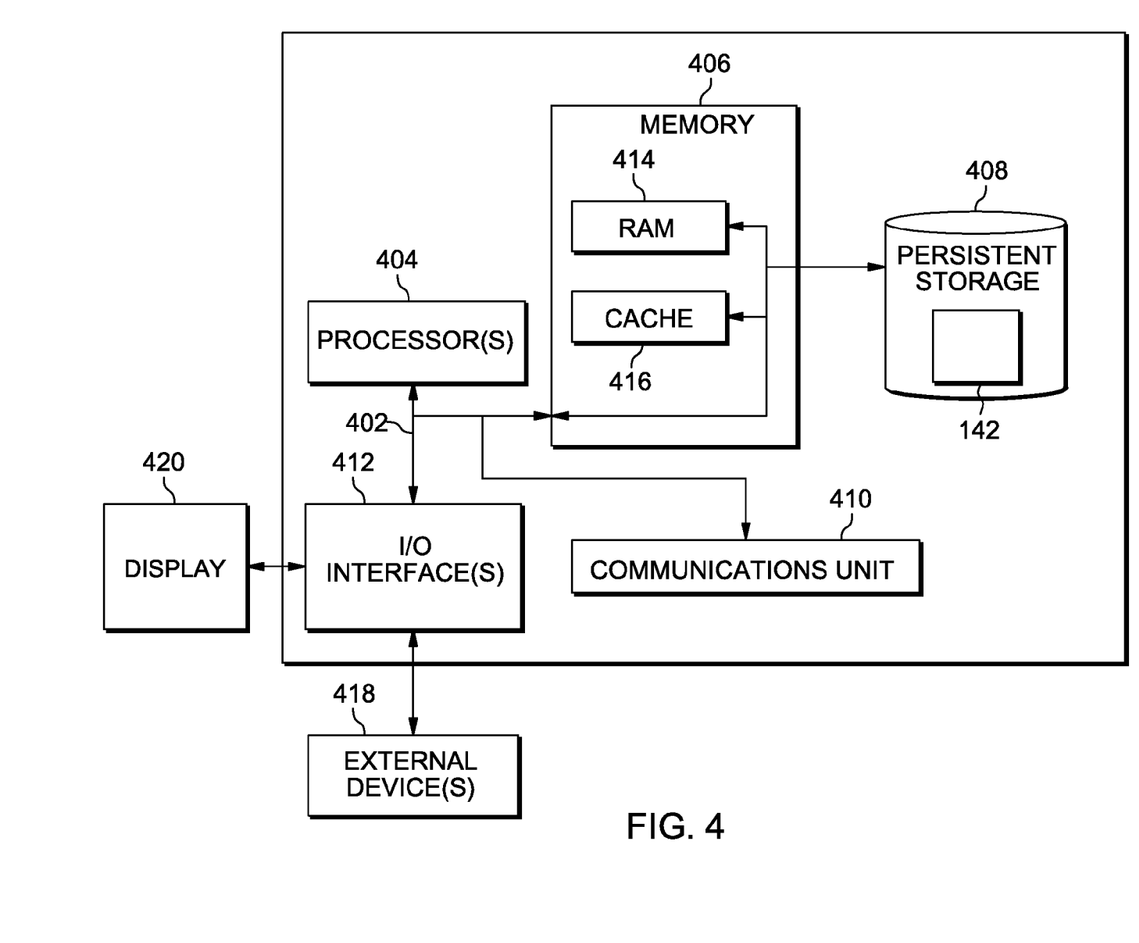
FIG. 4 depicts a block diagram of components of a server computing device, in accordance with an embodiment of the present invention.

FIG. 4 depicts a block diagram of components of server computing device 140, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server computing device 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Message analysis program 142 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between sender computing device 120, recipient computing device 130, and server computing device 140. In these examples, communications unit 410 includes one or more network interface cards. Communications unit 410 may provide communications through the use of either or both physical and wireless communications links. Message analysis program 142 may be downloaded to persistent storage 408 through communications unit 410.

I/O interface(s) 412 allows for input and output of data with other devices that may be connected to server computing device 140. For example, I/O interface 412 may provide a connection to external device(s) 418 such as a keyboard, keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., message analysis program 142, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a time before a recipient views a communication, the method comprising:
    a computer receiving a communication from a sender in a collaboration application;
    the computer determining one or more attributes of the communication, the attributes including at least a recipient of the communication;
    the computer determining a plurality of viewing data for the recipient of the communication, including:
        the computer determining a history of communication viewing behavior of the recipient;
        the computer determining a state of social network use of the recipient;
        the computer determining a calendar of the recipient;
        the computer determining a consumption rate of a plurality of communications of the recipient;
        the computer determining types of activities of the recipient during a particular scheduled calendar time; and
        indicating types of communications the recipient can view during the particular scheduled calendar time;
    the computer determining, based, at least in part, on the one or more attributes of the communication and the plurality of viewing data for the recipient, a time before the recipient views the communication in the collaboration application, wherein the time before the recipient views the communication is an expected time lapse estimate of when the recipient views the communication after receiving the communication from the sender in the collaboration application;
    the computer determining one or more alterations to the communication; and
    the computer sending the one or more alterations to the communication to the sender.

2. The method of claim 1, further comprising:
    the computer retrieving one or more preferences of the sender corresponding to the communication, the preferences including at least a preference for a threshold value of time before a recipient views a communication;
    the computer determining whether the determined time before the recipient views the communication exceeds the threshold value of time; and
    wherein the computer determining one or more alterations to the communication further comprises: the computer determining one or more alterations to the communication responsive to the computer determining the determined time before the recipient views the communication exceeds the threshold value of time.

3. The method of claim 2, wherein the one or more preferences of the sender corresponding to the communication include at least one of: a time for the communication to be read, a time for the recipient to spend reading the communication, a response from the recipient, a percentage of a group of recipients to view the communication, and the preference for the threshold value of time before the recipient views the communication.

4. The method of claim 1, further comprising:
    the computer displaying the time before the recipient views the communication to the sender; and
    the computer receiving an indication from the sender that the determined time before the recipient views the communication is not accepted.

5. The method of claim 1, wherein the computer determining one or more alterations to the communication further comprises: the computer determining one or more alterations to the communication based, at least in part, on the plurality of viewing data for the recipient.

6. The method of claim 5, wherein the computer determining one or more alterations to the communication based, at least in part, on the plurality of viewing data for the recipient further comprises: the computer determining, based, at least in part, on the history of communication viewing behavior of the recipient, the state of social network use of the recipient, the calendar of the recipient, and the consumption rate of a plurality of communications of the recipient, an optimal time at which to send the communication.

7. The method of claim 5, wherein the one or more alterations to the communication include at least one of: a decrease in word count of the communication, an alternate time at which to send the communication, and an alternate collaboration application in which to send the communication.

8. The method of claim 1, wherein the one or more attributes of the communication include at least one of: the sender, a content, a subject, an importance setting of the communication, a recipient, and a group of recipients with access to the communication.

9. A computer program product for determining a time before a recipient views a communication, the computer program product comprising:
one or more computer-readable storage media, wherein the one or more computer-readable storage media are non-transitory, and program instructions stored on the one or more computer-readable storage media, the program instructions comprising:
program instructions to receive a communication from a sender in a collaboration application;
program instructions to determine one or more attributes of the communication, the attributes including at least a recipient of the communication;
program instructions to determine a plurality of viewing data for the recipient of the communication, including:
program instructions to determine a history of communication viewing behavior of the recipient;
program instructions to determine a state of social network use of the recipient;
program instructions to determine a calendar of the recipient;
program instructions to determine a consumption rate of a plurality of communications of the recipient;
program instructions to determine types of activities of the recipient during a particular scheduled calendar time; and
program instructions to indicate types of communications the recipient can view during the particular scheduled calendar time;
program instructions to determine, based, at least in part, on the one or more attributes of the communication and the plurality of viewing data for the recipient, a time before the recipient views the communication in the collaboration application, wherein the time before the recipient views the communication is an expected time lapse estimate of when the recipient views the communication after receiving the communication from the sender in the collaboration application;
program instructions to determine one or more alterations to the communication; and
program instructions to send the one or more alterations to the communication to the sender.

10. The computer program product of claim 9, further comprising:
program instructions to retrieve one or more preferences of the sender corresponding to the communication, the preferences including at least a preference for a threshold value of time before a recipient views a communication;
program instructions to determine whether the determined time before the recipient views the communication exceeds the threshold value of time; and
wherein the program instructions to determine one or more alterations to the communication further comprise: program instructions to determine one or more alterations to the communication responsive to determining the determined time before the recipient views the communication exceeds the threshold value of time.

11. The computer program product of claim 10, wherein the one or more preferences of the sender corresponding to the communication include at least one of: a time for the communication to be read, a time for the recipient to spend reading the communication, a response from the recipient, a percentage of a group of recipients to view the communication, and the preference for the threshold value of time before the recipient views the communication.

12. The computer program product of claim 9, further comprising:
program instructions to display the time before the recipient views the communication to the sender; and
program instructions to receive an indication from the sender that the determined time before the recipient views the communication is not accepted.

13. The computer program product of claim 9, wherein the program instructions to determine one or more alterations to the communication further comprises: program instructions to determine one or more alterations to the communication based, at least in part, on the plurality of viewing data for the recipient.

14. A computer system for determining a time before a recipient views a communication, the computer program product comprising:
one or more computer processors;
one or more computer-readable storage media, wherein the one or more computer-readable storage media are non-transitory;
program instructions stored on the computer-readable storage media for execution by at least one of the one or more processors, the program instructions comprising:
program instructions to receive a communication from a sender in a collaboration application;
program instructions to determine one or more attributes of the communication, the attributes including at least a recipient of the communication;
program instructions to determine a plurality of viewing data for the recipient of the communication, including:
program instructions to determine a history of communication viewing behavior of the recipient;
program instructions to determine a state of social network use of the recipient;
program instructions to determine a calendar of the recipient;
program instructions to determine a consumption rate of a plurality of communications of the recipient;
program instructions to determine types of activities of the recipient during a particular scheduled calendar time; and
program instructions to indicate types of communications the recipient can view during the particular scheduled calendar time;
program instructions to determine, based, at least in part, on the one or more attributes of the communication and the plurality of viewing data for the recipient, a time before the recipient views the communication in the collaboration application, wherein the time before the recipient views the communication is an expected time lapse estimate of when the recipient views the communication after receiving the communication from the sender in the collaboration application;

program instructions to determine one or more alterations to the communication; and program instructions to send the one or more alterations to the communication to the sender.

15. The computer system of claim 14, further comprising:
program instructions to retrieve one or more preferences of the sender corresponding to the communication, the preferences including at least a preference for a threshold value of time before a recipient views a communication;

program instructions to determine whether the determined time before the recipient views the communication exceeds the threshold value of time; and wherein the program instructions to determine one or more alterations to the communication further comprise: program instructions to determine one or more alterations to the communication responsive to determining the determined time before the recipient views the communication exceeds the threshold value of time.

16. The computer system of claim 14, further comprising:
program instructions to display the time before the recipient views the communication to the sender; and program instructions to receive an indication from the sender that the determined time before the recipient views the communication is not accepted.

17. The computer system of claim 14, wherein the program instructions to determine one or more alterations to the communication further comprises: program instructions to determine one or more alterations to the communication based, at least in part, on the plurality of viewing data for the recipient.

18. The method of claim 1, wherein the one or more alterations to the communication further includes determining alternate form or forms of communication for the communication and sending the alternate form or forms of communication.

19. The method of claim 1, wherein the computer determining a plurality of viewing data for the recipient of the communication further comprises determining whether the communication will be missed based on location of the recipient's computing device.

20. The method of claim 1, wherein the computer determining a plurality of viewing data for the recipient of the communication further comprises determining whether the communication will be missed based on the recipient's pre-set viewing preferences.

* * * * *